(12) United States Patent
Morose

(10) Patent No.: US 12,157,833 B2
(45) Date of Patent: *Dec. 3, 2024

(54) COMPOSITION AND METHOD FOR REMOVING A COATING FROM A SURFACE

(71) Applicant: THE UNIVERSITY OF MASSACHUSETTS, Boston, MA (US)

(72) Inventor: Gregory Morose, Haverhill, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 1016 days.

This patent is subject to a terminal disclaimer.

(21) Appl. No.: 16/962,935

(22) PCT Filed: Feb. 27, 2019

(86) PCT No.: PCT/US2019/019750
§ 371 (c)(1),
(2) Date: Jul. 17, 2020

(87) PCT Pub. No.: WO2019/168919
PCT Pub. Date: Sep. 6, 2019

(65) Prior Publication Data
US 2021/0054219 A1 Feb. 25, 2021

Related U.S. Application Data

(60) Provisional application No. 62/636,403, filed on Feb. 28, 2018.

(51) Int. Cl.
| | | |
|---|---|---|
| *C11D 3/43* | (2006.01) | |
| *C09D 9/00* | (2006.01) | |
| *C11D 3/20* | (2006.01) | |
| *C11D 3/34* | (2006.01) | |
| *C11D 3/44* | (2006.01) | |
| *C11D 7/26* | (2006.01) | |

(52) U.S. Cl.
CPC ............ *C09D 9/005* (2013.01); *C11D 3/2041* (2013.01); *C11D 3/2044* (2013.01); *C11D 3/2065* (2013.01); *C11D 3/2093* (2013.01); *C11D 3/3445* (2013.01); *C11D 3/43* (2013.01); *C11D 7/261* (2013.01); *C11D 7/264* (2013.01); *C11D 7/266* (2013.01)

(58) Field of Classification Search
CPC ... C11D 3/2041; C11D 3/2044; C11D 3/2093; C11D 3/2096; C11D 3/2065; C11D 3/3445; C11D 3/43; C11D 7/261; C11D 7/264; C11D 7/266
USPC ........ 510/200, 201, 202, 492, 493, 505, 506
See application file for complete search history.

(56) References Cited

U.S. PATENT DOCUMENTS

| | | | |
|---|---|---|---|
| 4,120,810 A | 10/1978 | Palmer | |
| 5,310,496 A | 5/1994 | Taylor | |
| 5,456,853 A * | 10/1995 | Myers, II ............... | C09D 9/005 |
| | | | 510/202 |
| 5,486,305 A | 1/1996 | Faryniarz et al. | |
| 5,543,085 A | 8/1996 | Miner | |
| 5,817,612 A * | 10/1998 | Distaso .................... | C09D 9/00 |
| | | | 510/206 |
| 5,990,062 A * | 11/1999 | Summerfield ........... | C09D 9/00 |
| | | | 510/202 |
| 6,030,466 A * | 2/2000 | Myers, II ............... | C09D 9/005 |
| | | | 510/203 |
| 6,103,682 A | 8/2000 | Lallier | |
| 6,673,157 B1 | 1/2004 | McKim et al. | |
| 10,717,885 B2 * | 7/2020 | Morose ............... | C11D 11/0023 |
| 2001/0036988 A1 | 11/2001 | Kestyn et al. | |
| 2003/0119686 A1 | 6/2003 | McHac, Jr. et al. | |
| 2003/0207972 A1 | 11/2003 | Kestyn et al. | |
| 2004/0138077 A1 | 7/2004 | Pageau et al. | |

(Continued)

FOREIGN PATENT DOCUMENTS

| | | |
|---|---|---|
| CH | 670832 | 7/1989 |
| CN | 670832 A5 | 7/1989 |

(Continued)

OTHER PUBLICATIONS

Wollbrink T., "The composition of proprietary paint strippers," Journal of the American Institute for Conservation, vol. 32, No. 1; pp. 43-57.
Non-Final Office Action for U.S. Appl. No. 16/323,973, filed Feb. 7, 2019; 7 pages.
Internationa Search Report for the corresponding International Application No. PCT/US2019/019750; International Filing Date: Feb. 27, 2019; Date of Mailing: May 6, 2019; 4 pages.
International Search Report for International Application No. PCT/US2017/048338; International filing date: Aug. 24, 2017; Date of Mailing: Nov. 2, 2017; 11 pages.

(Continued)

*Primary Examiner* — Gregory R Delcotto
(74) *Attorney, Agent, or Firm* — CANTOR COLBURN LLP

(57) ABSTRACT

A composition includes a first solvent selected from methyl acetate, dimethyl carbonate, acetone, or a combination thereof, a second solvent selected from thiophene, 1,3-dioxolane, thioacetic acid, or a combination thereof, and, optionally, a third solvent selected from dimethyl sulfoxide, methyl glyoxal, propylene carbonate, gamma butyrolactone, ethylene carbonate, 2-chloro-1-propanol, methanol, ethanol, ethylene glycol, propylene glycol, 1-propanol, 2-propanol, or a combination thereof. The respective amounts of each solvent are further described herein, and the total amounts of the first solvent, the second solvent, and the third solvent sum to at least 90 volume percent of the total volume of the composition. The composition can be particularly useful for removal of a coating from a surface. Accordingly, a method of removing a coating from a surface is also disclosed.

14 Claims, No Drawings

(56) References Cited

U.S. PATENT DOCUMENTS

| | | |
|---|---|---|
| 2005/0227889 A1 | 10/2005 | Shireman |
| 2008/0139437 A1 | 6/2008 | Power |
| 2008/0161217 A1 | 7/2008 | Zhang et al. |
| 2009/0093390 A1 | 4/2009 | Gross et al. |
| 2012/0046212 A1 | 2/2012 | Bourdette et al. |
| 2012/0316096 A1 | 12/2012 | Li et al. |
| 2013/0210691 A1 | 8/2013 | Albright et al. |
| 2014/0255326 A1 | 9/2014 | Pasin et al. |
| 2016/0032115 A1 | 2/2016 | Pasin et al. |

FOREIGN PATENT DOCUMENTS

| | | |
|---|---|---|
| DE | 19526351 B4 | 6/2005 |
| GB | 2377710 A | 1/2003 |
| WO | 2007115962 A1 | 10/2007 |
| WO | 2018039415 | 3/2018 |

OTHER PUBLICATIONS

Ramsey, Geddes H., "Evaluating Alternative Paint Stripping Technologies Used in Aircraft and Space Vehicles", U.S. Environmental Protection Agency, National Risk Management Research Laboratory, Air Pollution Prevention and Control Division, Research Triangle Park, NC; pp. 8-27.

Written Opinion for the corresponding International Application No. PCT/US2019/019750; International Filing Date: Feb. 27, 2019; Date of Mailing: May 6, 2019; 9 pages.

Written Opinion of the International Searching Authority for International Application No. PCT/US2017/048338; International filing date: Aug. 24, 2017; Date of Mailing: Nov. 2, 2017; 5 pages.

\* cited by examiner

COMPOSITION AND METHOD FOR REMOVING A COATING FROM A SURFACE

CROSS-REFERENCE TO RELATED APPLICATIONS

This application is a National Stage application of PCT/US2019/019750, filed Feb. 27, 2019, which claims benefit of U.S. provisional Application No. 62/636,403 filed Feb. 28, 2018, both of which are incorporated by reference herein in their entirety.

BACKGROUND

Methylene chloride is a widely used component for paint stripping products. Three major categories of use include industrial use, professional use (i.e., by a tradesman), and consumer use. Methylene chloride is highly volatile and the primary route of exposure is inhalation, which can lead to acute and chronic human health hazards. For example, methylene chloride can cause acute and chronic effects on the central nervous system. The inhalation of methylene chloride can result in short term effects such as dizziness, clumsiness, headache, nausea, and numbness of fingers and toes, and long term effects such as loss of concentration, memory loss, and personality changes. There have been numerous occupational and consumer deaths during paint stripping operations resulting from acute methylene chloride poisoning. Further, methylene chloride is classified as a human carcinogen. Consequently, there is increasing demand for paint stripping products that do not contain methylene chloride.

Several commercially available products do not contain methylene chloride, however, their paint stripping performance is significantly below that of methylene chloride, and the replacement chemicals, such as N-Methyl-2-Pyrrolidone (NMP), introduce other environmental, health, and safety hazards. Additionally, there are practical considerations surrounding the use of stripping products that do not include methylene chloride, for example, longer required dwell times, and stripping coatings one layer at a time necessitating multiple applications.

Accordingly, there remains a continuing need for alternative compositions for removing various multilayer coatings from surfaces (e.g., paint stripping compositions) that do not contain methylene chloride, NMP, or other hazardous ingredients. An alternative composition preferably can have a low volatile organic compound (VOC) content, be effective across a wide range of coatings and surfaces with a reasonable dwell time, does not damage substrate material (i.e., will not stain, discolor, or alter the substrate, corrode a metal substrate, or raise the wood grain for wood surfaces), and have adequate viscosity to remain in place on vertical surfaces. Effective paint stripping compositions can further exhibit adequate penetration into the coating to reach the substrate surface, and can have desirable Hansen Solubility Parameters in order to dissolve the variety of coatings that can be encountered.

BRIEF SUMMARY

One embodiment is a composition comprising, based on the total volume of the composition, 30 to 90 volume percent of a first solvent selected from methyl acetate, dimethyl carbonate, acetone, or a combination thereof; greater than 0 to 60 volume percent of a second solvent selected from thiophene, 1,3-dioxolane, thioacetic acid, or a combination thereof; and 0 to 20 volume percent of a third solvent selected from dimethyl sulfoxide, methyl glyoxal, propylene carbonate, gamma butyrolactone, ethylene carbonate, 2-chloro-1-propanol, methanol, ethanol, ethylene glycol, propylene glycol, 1-propanol, 2-propanol, or a combination thereof; wherein the amounts of the first solvent, the second solvent, and the third solvent sum to at least 90 volume percent.

Another embodiment is a method of removing a coating from a surface, the method comprising contacting the composition with a surface comprising a coating disposed on at least a portion of the surface, and separating at least a portion of the coating from the surface.

These and other embodiments are described in detail below.

DETAILED DESCRIPTION

The present inventor has discovered new compositions that have comparable solvency characteristics as methylene chloride-containing compositions. Advantageously, the compositions can have low (e.g., less than or equal to 20 volume percent) amounts of dimethyl sulfoxide. Thus, the compositions described herein are particularly useful for removal of a variety of coatings from various surfaces. The compositions of the present disclosure provide an improved environmental, health, and safety profile as compared to current compositions commonly used for removal of multilayer coatings from surfaces.

Accordingly, one aspect of the present disclosure is a composition. The composition comprises a particular combination of solvents. Specifically, the composition comprises a first solvent selected from methyl acetate, dimethyl carbonate, acetone, or a combination thereof, a second solvent selected from thiophene, 1,3-dioxolane, thioacetic acid, or a combination thereof, and a third solvent selected from dimethyl sulfoxide, methyl glyoxal, propylene carbonate, gamma butyrolactone, ethylene carbonate, 2-chloro-1-propanol, methanol, ethanol, ethylene glycol, propylene glycol, 1-propanol, 2-propanol, or a combination thereof. In some embodiments, the third solvent can be selected from dimethyl sulfoxide, methyl glyoxal, propylene carbonate, gamma butyrolactone, ethylene carbonate, 2-chloro-1-propanol, or a combination thereof. In some embodiments, the first solvent is methyl acetate, the second solvent is dimethyl sulfoxide, and the third solvent is 1,3-dioxolane.

The first solvent can be present in the composition in an amount of 30 to 90 volume percent, or 30 to 80 volume percent, or 40 to 70 volume percent, or 45 to 65 volume percent, or 45 to 55 volume percent, or 50 to 60 volume percent, or 30 to less than 60 volume percent, based on the total volume of the composition. The second solvent can be present in the composition in an amount of greater than 0 to 60 volume percent, or 5 to 60 volume percent, or 10 to 55 volume percent, or 20 to 55 volume percent, or 25 to 55 volume percent, or 20 to 50 volume percent, or 40 to 60 volume percent, or 25 to 35 volume percent, or 35 to 45 volume percent, based on the total volume of the composition. The third solvent can be present in the composition in an amount of 0 to 20 volume percent, or 0 to less than 20 volume percent, or greater than 0 to less than 20 volume percent, or 1 to 19 volume percent, or 3 to 18 volume percent, or 5 to 15 volume percent, or 10 to less than 20 volume percent, based on the total volume of the composition.

The total amounts of the first solvent (e.g., methyl acetate, dimethyl carbonate, and acetone), the second solvent (e.g., thiophene, 1,3-dioxolane, and thioacetic acid), and the third solvent (e.g., dimethyl sulfoxide, methyl glyoxal, propylene carbonate, gamma butyrolactone, ethylene carbonate, and 2-chloro-1-propanol, methanol, ethanol, ethylene glycol, propylene glycol, 1-propanol, and 2-propanol) sum to at least 90 volume percent, or at least 92 volume percent, or at least 95 volume percent, or at least 97 volume percent, or at least 98 volume percent, or at least 99 volume percent.

In some embodiments, the composition can be substantially free of certain solvents. As used herein, the term "substantially free" means that the composition includes less than or equal to 10 volume percent, or less than or equal to 5 volume percent, or less than or equal to 1 volume percent, or less than or equal to 0.5 volume percent, or less than or equal to 0.1 volume percent of the recited solvent. For example, in some embodiments, the composition can be substantially free of methylene chloride, N-methylpyrrolidone, methanol, toluene, ethyl acetate, n-butyl amine, propyl acetate, tetrahydrofuran, ethanol, ethylene glycol, propylene glycol, 1-propanol, 2-propanol, or a combination thereof. In some embodiments, the composition can exclude a particular solvent, for example the composition can exclude methylene chloride, N-methylpyrrolidone, methanol, toluene, ethyl acetate, n-butyl amine, propyl acetate, tetrahydrofuran, or a combination thereof (i.e., no methylene chloride, N-methylpyrrolidone, methanol, toluene, ethyl acetate, n-butyl amine, propyl acetate, tetrahydrofuran, or a combination thereof is present in the composition). In an embodiment, the composition can be substantially free of dimethyl sulfoxide, thiophene, or both. In an embodiment, the composition can exclude dimethyl sulfoxide, thiophene, or both. In some embodiments, the composition can be substantially free of or exclude solvents other than methyl acetate, dimethyl carbonate, acetone, dimethyl sulfoxide, methyl glyoxal, propylene carbonate, gamma butyrolactone, ethylene carbonate, 2-chloro-1-propanol, thiophene, 1,3-dioxolane, and thioacetic acid. In some embodiments, the composition can exclude solvents other than methyl acetate, dimethyl carbonate, acetone, dimethyl sulfoxide, methyl glyoxal, propylene carbonate, thiophene, 1,3-dioxolane, and thioacetic acid. In some embodiments, the composition can include up to 10 volume percent of solvents other than methyl acetate, dimethyl carbonate, acetone, dimethyl sulfoxide, methyl glyoxal, propylene carbonate, gamma butyrolactone, ethylene carbonate, 2-chloro-1-propanol, methanol, ethanol, ethylene glycol, propylene glycol, 1-propanol, 2-propanol, thiophene, 1,3-dioxolane, and thioacetic acid.

In a specific embodiment, the composition comprises, based on the total volume of the composition, 30 to 80 volume percent, or 40 to 70 volume percent, or 45 to 65 volume percent methyl acetate, acetone, or a combination thereof; 0 to less than 20 volume percent, or greater than 0 to less than 20 volume percent, or 1 to 19 volume percent dimethyl sulfoxide; and 5 to 50 volume percent, or 10 to 50 volume percent, or 20 to 50 volume percent, or 25 to 45 volume percent 1,3-dioxolane. The amounts of methyl acetate, acetone, dimethyl sulfoxide, and 1,3-dioxolane sum to at least 90 volume percent, or at least 92 volume percent, or at least 95 volume percent, or at least 97 volume percent, or at least 98 volume percent, or at least 99 volume percent.

In another specific embodiment, the composition can comprise, based on the total volume of the composition, 50 to 60 volume percent methyl acetate, 10 to less than 20 volume percent dimethyl sulfoxide, and 25 to 35 volume percent 1,3-dioxolane. In another specific embodiment, the composition can comprise, based on the total volume of the composition, 45 to 55 volume percent methyl acetate, 5 to 15 volume percent dimethyl sulfoxide, and 35 to 45 volume percent 1,3-dioxolane.

In yet another specific embodiment, the composition can comprise 40 to 60 volume percent methyl acetate and 40 to 60 volume percent 1,3-dioxolane. Thus in some embodiments, dimethylsulfoxide can be excluded from the composition.

In some embodiments, the composition can further comprise an additive. The additive(s) can be selected to achieve a desired property, with the proviso that the additive(s) are also selected so as to not significantly adversely affect a desired property of the composition. In some embodiments, the additive can be selected from the group consisting of thickeners, wetting agents, colorants, rinsing agents, evaporation inhibitors, activators, corrosion inhibitors, surfactants, fragrances, preservatives, and combinations thereof. In some embodiments, the additive can preferably be selected from the group consisting of thickeners, colorants, evaporation inhibitors, activators, corrosion inhibitors, surfactants, fragrances, and combinations thereof. Thickeners are generally used to increase the viscosity of the composition. Exemplary thickeners can include, for example, cellulose ethers (e.g., hydroxypropyl cellulose, ethyl cellulose, ethyl hydroxyethyl cellulose, methyl cellulose, and other alkyl or hydroxyalkyl cellulose, and combinations thereof); silica including colloidal silica; clays (e.g., bentonite and montmorillonite starch); alumina including colloidal alumina; gum arabic; tragacanth; agar; sugar derivatives; high molecular weight polyethylene oxides; fatty acid salts; guar gum; xanthan gum; polyvinyl pyrrolidone and methyl vinyl ether/maleic anhydride copolymers; paraffinic waxes (e.g., polyethylene wax); and the like, or a combination thereof. Colorants can be used to provide color to the composition. Exemplary colorants can include, for example, pigments, dyes, or combinations thereof. Evaporation inhibitors can be used to reduce evaporation of the composition, thus increasing the amount of contact time with a coating to be removed. Exemplary evaporation inhibitors can include, for example, film forming resins, acrylic resins, hydrocarbon resins (such as polyethylene), waxes (such as paraffin wax and ester waxes), or a combination thereof. Activators can be used to increase the penetration of the composition into a coating matrix coating a surface. Exemplary activators can include, for example, $C_1$-$C_{22}$ carboxylic acids (e.g., formic acid, acetic acid, propionic acid, oleic acid, oxalic acid, hydroxyacetic acid, and the like, or a combination thereof) and organoamines (e.g., ethanolamine, diethanolamine, ethylenediaminetetraacetic acid, morpholine, triethanolamine, triethylamine, 2-(N,N'-diethylamino)ethanol, and the like, or a combination thereof). In some embodiments, organoamine activators can be used. In some embodiments, when an acidic activator is used, it can be desirable to also incorporate a corrosion inhibitor. Corrosion inhibitors can be used to provide stability to the composition in a packaging container, or to protect a substrate to which the composition can be applied (e.g., a metal substrate). Exemplary corrosion inhibitors can include, for example, triethylammonium phosphate, sodium benzoate, alkali metal and alkaline earth alkyl aromatic sulfonates, and the like, or a combination thereof. Surfactants can be used to enhance wetting or penetration of the composition onto or into a coating. Exemplary surfactants can be anionic, cationic, nonionic, or amphoteric, and can include, for example, polyoxyethylene derivatives of aromatic and aliphatic alcohols, (e.g., nonyl phenoxy polyoxyethylene ethanol), alkali metal salts of $C_{8-22}$ aliphatic sulfates (e.g., sodium lauryl sulfate, and the like), alkali metal salts of alkyl aromatic sulfonates (e.g., sodium dodecyl benzene sulfonate, and the like), dialkyl sulfosuccinates (e.g., dioctyl sulfosuccinate, and the like), and the like, and combinations thereof. Fragrances can be used to provide an acceptable fragrance or aroma to the composition which would improve consumer acceptance. Exemplary fragrances can include, for example, citronellol, orange oil, orange, terpenes, lemon oil, linalool, citral, and the like, and combinations thereof.

When present, the additive(s) can be included in the composition in an amount of greater than 0 to 10 weight percent, or 1 to 10 weight percent, or 2 to 5 weight percent, based on the total weight of the first solvent, the second solvent, and the third solvent.

In some embodiments, the composition can be substantially free of swelling agents. In some embodiments the composition can exclude a swelling agent. Without wishing to be bound by theory, swelling agents can cause swelling of a coating (e.g., a polymeric coating) enabling better cracking of the coating. Swelling agents can include, for example, glycol ethers (e.g., ethylene glycol, propylene glycol, diethylene glycol monoethyl ether, diethyleneglycol monobutylether, ethylene glycol monomethyl ether, ethylene glycol monoethyl ether, ethylene glycol monopropyl ether, ethylene glycol monoisopropyl ether, ethylene glycol monobutylether, ethylene glycol monophenyl ether, ethylene glycol monobenzyl ether, diethylene glycol monomethyl ether, and the like, or a combination thereof), aliphatic alcohols having 3 to 9 carbon atoms (e.g., isopropanol, dimethyl heptanol, nonyl alcohol, and the like, or a combination thereof), or a combination thereof.

The composition of the present disclosure advantageously exhibits an improved environmental, health, and safety profile compared to other compositions, for example methylene chloride-containing compositions commonly employed for removing coatings from surfaces. For example, the composition advantageously has a volatile organic compound content of less than 50 percent.

As discussed above, effective compositions for removing various coatings can further exhibit adequate penetration into the coating to reach the substrate surface. Without wishing to be bound by theory, to achieve adequate paint penetration, the molecular volume of the composition should preferably be small enough to enable the composition to penetrate through the coating layers and reach the substrate surface. Breaking the bond between the substrate and the first layer of coating is believed to facilitate the complete removal of any remaining coating layers. Methylene chloride based compositions generally have a molecular volume in the range of 61 to 69 milliliters per mole (ml/mol), depending on the particular formulation. Compositions having molecular volumes of greater than 80 ml/mol can exhibit a reduced penetration effectiveness, in particular for coatings comprising one or more layers of oil, epoxy, varnish, and shellac. Thus, in some embodiments, the composition can preferably have a molecular volume of less than or equal to 80 ml/mol. In some embodiments, the composition is substantially free of high molecular volume solvents, for example high molecular volume esters such as tributyl citrate (molecular volume of 345 ml/mol), diethyl tartrate (molecular volume of 167 ml/mol); esters of lactic acids, including methyl lactate (molecular volume of 96 ml/mol), amyl lactate (molecular volume of 163 ml/mol), and n-butyl lactate (molecular volume of 149 ml/mol); esters of oxalic acid including dibutyl oxalate (molecular volume of 205 ml/mol); sugar esters including sucrose acetate isobutyrate (molecular volume of 739 nil/mol); and carboxylic acid methyl esters including methyl butyrate (molecular volume of 114 ml/mol), methyl propionate (molecular volume of 97 ml/mol), and n-butyl butyrate (molecular volume of 166 ml/mol). In some embodiments, the composition can exclude the above described high molecular volume solvents.

In addition, without wishing to be bound by theory, the ability of a composition to penetrate through the coating layers and reach the substrate surface can depend on hydrogen bonding values of the composition. In particular, high hydrogen bonding values can inhibit paint penetration.

The composition can be prepared by mixing the components, for example, by blending using a mechanical mixer in a tank or other similar vessel. When one or more additives are included, the one or more additives can generally be added at any suitable time during mixing of the components. For example, the one or more additives can be added slowly to the solvent components while mixing. Alternatively, the solvent components and any additives can be added and mixed simultaneously.

Another aspect of the present disclosure is a method of removing a coating from a surface. The method comprises contacting the above-described composition with a surface comprising a coating disposed on at least a portion of the surface, and separating at least a portion of the coating from the surface.

In some embodiments, the coating can comprise more than one coating layer (i.e., the coating can be a multilayer coating), for example more than one to ten coating layers (e.g., 2, 3, 4, 5, 6, 7, 8, 9, or 10 coating layers). Each coating layer can be the same or different. In some embodiments, the coating (or coating layer(s) when more than one coating layer is present) can comprise epoxy, latex enamel paints, alkyd paints, oil-based paints, varnish, shellac, paint, lacquer, polyurethane, primers, basecoats, clearcoats, chemical agent resistant coatings, conformal coatings, aircraft coatings, automobile coatings, milk paint, or a combination thereof.

In some embodiments, the surface comprises wood, metal (e.g., aluminum, steel, and the like), ceramic, brick, stone, concrete, glass, polymer (e.g., plastic, rubber, and the like), or a combination thereof. In some embodiments, the surface comprises wood. In some embodiments, the compositions can be particularly useful for removing paints and coatings from furniture, automobiles, boats, trains, airplanes, military vehicles, paint guns, and the like.

Contacting the composition with a coated surface can be by, for example, dipping, spraying, brushing, dropping, or pouring the composition onto the coated surface.

In some embodiments, the contacting can be for a period of time effective to enable significant separation or removal of the coating from the surface, preferably without causing substantial damage to the surface. Contacting the compositions with a coating disposed on a surface can often be accompanied by changes to the coating including penetration, softening, swelling, flaking, cracking, chemical reacting, dissolution of the coating, or a combination thereof. In some embodiments, the contacting can be for a time of 5 to 40 minutes, or 8 to 35 minutes, or 10 to 25 minutes, or 15 to 25 minutes, sometimes referred to as the "dwell time". In some embodiments, separating the coating from the surface can be, for example, by scraping, brushing, sanding, washing, pressurized spraying of gases or liquids, abrasive particles, and the like, or a combination thereof.

In some embodiments, the contacting can be at ambient temperature. In some embodiments, for example when shorter contact times are desired, the composition, the coated substrate, or both can be heated, for example to a temperature of 20 to 200° C.

In some embodiments, the method of the present disclosure can achieve at least 60% substrate exposure (i.e., at least 60% of the underlying surface can be exposed following treatment of the coated surface with the composition, and subsequent separation of the coating from the surface. In some embodiments, the method of the present disclosure can achieve at least 65% substrate exposure. In some embodiments, the method can further comprise repeating the contacting and subsequent separating of the coating from the substrate as needed, for example until a desired surface exposure is achieved. For example, the method can further comprise repeating the contacting and separating one, two, three or four times.

Thus, the present inventors have discovered new compositions comprising a particular combination of solvents that are particularly useful for removal of a variety of coatings from surfaces. The compositions of the present disclosure provide an improved environmental, health, and safety profile as compared to current compositions commonly used for removal of coatings from surfaces.

EXAMPLES

Test substrates were prepared from either white pine cut to 2.5×12 inches or 3.5×15 inches. Coated substrates were prepared and evaluated using a modified version of ASTM Standard D6189. For the wood substrates, an oil-based primer layer was first coated on each substrate. The primed substrate was then coated with four to six layers of the desired coating. Between application of each layer, the substrate was lightly sanded using 100 grit sandpaper and wiped clean with isopropyl alcohol in order to improve the adhesion between each layer of the coating. Each layer of coating was allowed to dry for one day at ambient temperature. The coated substrate was then aged for three weeks in an oven at 60° C. (140° F.) to simulate eleven months of aging. The coated wood substrates (denoted as "S") used for the following examples are described in Table 1.

The oil primer used to prepare the substrates of Table 1 is available under the tradename KILZ Original, available from Masterchem Industries LLC. The epoxy used to prepare the substrates of Table 1 is available as Specialty Appliance Epoxy from Rust-Oleum Corporation. The shellac used to prepare the substrates of Table 1 is available as Zinsser Bulls-eye Shellac from Rust-Oleum Corporation. The lacquer used to prepare the substrates of Table 1 is available as Clear Brushing Lacquer from Minwax. The polyurethane used to prepare the substrates of Table 1 is available as Varathane Polyurethane from Rust-Oleum. The varnish used to prepare the substrates of Table 1 is available as Marine Coatings Spar Varnish from Rust-Oleum. The oil used to prepare the substrates of Table 1 is available as Glidden Oil Gloss Trim and Door Paint. The latex used to prepare the substrates of Table 1 is available as Behr Premium Plus Indoor Satin Enamel Paint.

The substrates S1-S8 described above were subsequently used for testing the stripping ability of various compositions, expressed as percent substrate exposure. To test the various compositions on substrates S1-S8, several ring gaskets were first glued to the desired test areas on the substrates. Using a clean pipette, about 1.5 milliliters of the solvent compositions were added to the substrate inside a designated ring gasket. The ring gasket was covered using a watch glass, and a timer was started to record dwell time. After the predetermined dwell time, the watch glass was removed and the coating residue was lightly scraped off the substrate with a square-tipped plastic scraping spatula. Dwell times were selected in order to achieve 65 to 95% substrate exposure determined using the composition of Comparative Example 1, noting that different coatings can require different dwell times for removal.

The percent substrate exposure was recorded for each composition with each coated substrate. The solvent compositions of each formulation tested are shown in Table 2, and the percent substrate exposure for each of substrates S1-S8 achieved with the various example compositions is shown in Table 3. The amounts of the various components in each composition shown in Table 2 are provided as volume percent, based on the total volume of the composition. Where two dwell times are listed in Table 3, the substrate was exposed to the composition using the above procedure for the first listed dwell time, the coating was lightly scraped with a square-tipped plastic scraping spatula, and the substrate was subsequently exposed to the composition a second time for the second listed dwell time, followed by a second scraping of the coating. The percent substrate exposure was determined after the second scraping.

TABLE 1

|  | S1 | S2 | S3 | S4 | S5 | S6 | S7 | S8 |
| --- | --- | --- | --- | --- | --- | --- | --- | --- |
| Substrate | White pine | White pine | White pine | White pine | White pine | White pine | White pine | White pine |
| Primer | Oil Primer | Oil Primer | Oil Primer | Oil Primer | Oil Primer | Oil Primer | Oil Primer | Oil Primer |
| Coating Layers | | | | | | | | |
| 1$^{st}$ Layer | Epoxy | Shellac | Lacquer | Polyurethane | Varnish | Oil | Latex | Latex |
| 2$^{nd}$ Layer | Epoxy | Shellac | Lacquer | Polyurethane | Varnish | Oil | Latex | Oil |
| 3$^{rd}$ Layer | Epoxy | Shellac | Lacquer | Polyurethane | Varnish | Oil | Latex | Latex |
| 4$^{th}$ Layer | Epoxy | Shellac | Lacquer | Polyurethane | Varnish | Oil | Latex | Oil |
| 5$^{th}$ Layer | — | — | — | — | — | — | — | Polyurethane |
| 6$^{th}$ Layer | — | — | — | — | — | — | — | Polyurethane |

TABLE 2

| Example | Chemical Description |
|---|---|
| CE1 | A methylene chloride-based paint remover containing 25-30% methylene chloride, 25-30% methanol, and 15-20% toluene, available under the tradename STRYPEEZE from Savogran Company. |
| CE2 | A methylene chloride-based paint remover containing 85-90% methylene chloride, 5-10% methanol, and 0-5% toluene, available under the tradename SUPERSTRIP from Savogran Company. |
| CE3 | A methylene chloride-based paint remover containing 60-100% methylene chloride and 15-25% methanol, available under the tradename KLEAN-STRIP from W. M. Barr. |
| CE4 | A benzyl alcohol-containing paint stripper, available under the tradename ECOFAST from Eco Safety Products. |
| CE5 | A benzyl alcohol-containing paint stripper containing 20-40% benzyl alcohol and 10-20% N-methylpyrrolidone, available under the tradename PEEL AWAY from Dumond Chemicals. |
| CE6 | A composition containing 20-60% dibasic esters, 30-60% N-methylpyrrolidone, and 1-5% citrus, available under the tradename CITRISTRIP from W. M. Barr. |
| CE7 | A benzyl alcohol-containing paint stripper containing 25-35% benzyl alcohol. 9-21% dibasic esters, 1-3% formic acid, and 1-2% propylene glycol, available under the tradename READY STRIP from Sunnyside Corp. |
| CE8 | A composition containing 3-7% dimethyl adipate, 5-10% dimethyl succinate. 10-30% dimethyl glutarate, and 3-7% triethyl phosphate, available under the tradename EZ STRIP from EZ Strip USA Inc. |
| CE9 | A composition containing 3-10% acetone and 10-20% glycol ether, available under the tradename LIFTOFF from Motsenbockers. |
| CE10 | A benzyl alcohol-containing paint stripper containing 30-50% benzyl alcohol, 40-60% water, and 1-5% titanium dioxide, available under the tradename SMART STRIP from Dumond Chemicals. |
| CE11 | A solvent blend containing 80% t-butyl acetate and 20% dimethyl sulfoxide, having a molecular volume of 122 ml/mol. |
| CE12 | A solvent blend containing 75% ethyl lactate and 25% dimethyl sulfoxide, having a molecular volume of 119 ml/mol. |
| CE13 | A solvent blend containing 80% triethyl citrate and 20% dimethyl sulfoxide, having a molecular volume of 208 ml/mol. |
| E1 | A solvent blend containing 55% methyl acetate, 15% dimethyl sulfoxide, and 30% 1,3-dioxolane, having a molecular volume of 75 ml/mol. |
| E2 | A solvent blend containing 50% methyl acetate, 10% dimethyl sulfoxide, and 40% 1,3-dioxolane, having a molecular volume of 75 ml/mol. |

TABLE 3

| Substrate | Dwell Time (minutes) | CE1 | CE2 | CE3 | E1 | E2 | CE4 | CE5 | CE6 | CE7 | CE8 | CE9 | CE10 | CE11 | CE12 | CE13 |
|---|---|---|---|---|---|---|---|---|---|---|---|---|---|---|---|---|
| S1 | 20, 10 | 80 | 95 | 99 | 95 | 90 | 0 | 0 | 0 | 0 | 0 | 0 | 0 | 0 | 0 | 0 |
| S2 | 8 | 65 | 75 | 70 | 95 | 80 | 0 | 0 | 0 | 0 | 0 | 0 | 0 | 0 | 0 | 0 |
| S3 | 10 | 77 | 95 | 85 | 95 | 95 | 0 | 0 | 0 | 0 | 0 | 0 | 0 | 0 | 45 | 0 |
| S4 | 10 | 95 | 85 | 85 | 90 | 90 | 0 | 0 | 0 | 0 | 0 | 0 | 0 | 0 | 5 | 0 |
| S5 | 20, 12 | 85 | 85 | 85 | 90 | 80 | 0 | 0 | 0 | 0 | 0 | 0 | 0 | 0 | 0 | 0 |
| S6 | 25, 10 | 95 | 90 | 95 | 85 | 90 | 0 | 0 | 0 | 0 | 0 | 0 | 0 | 0 | 0 | 0 |
| S7 | 25 | 85 | 80 | 85 | 80 | 75 | 0 | 0 | 0 | 0 | 0 | 0 | 0 | 0 | 40 | 0 |
| S8 | 20, 15 | 82 | 90 | 85 | 85 | 90 | 0 | 0 | 0 | 0 | 0 | 0 | 0 | 0 | 0 | 0 |
| Average % Exposure | | 83 | 87 | 86 | 89 | 86 | 0 | 0 | 0 | 0 | 0 | 0 | 0 | 0 | 11 | 0 |

The compositions according to the present disclosure are significantly less toxic to humans than the current solvents used in methylene-chloride based formulations. As shown in Table 3, the compositions according to Examples 1 and 2 performed similar to the methylene chloride-containing formulations of Comparative Examples 1-3 for coated wood substrates S1-S8. Additionally, the compositions according to Examples 1 and 2 outperformed by a wide margin several current alternative products, shown as Comparative Examples 4-10. As shown in Table 3, the compositions of Comparative Examples 4-10 failed to expose the substrate for any of the coated wood substrates S1-S8. Thus the compositions according to the present disclosure can advantageously penetrate multiple coating layers after a single application and a short dwell time (i.e., similar to the dwell times used for methylene chloride-containing compositions).

Comparative Examples 11-13 in Table 3 demonstrate the use of three compositions including esters having high molecular volumes, and thus are not effective for removing coatings, in particular for removing multilayer coatings (e.g., containing oil, epoxy, varnish, and shellac layers). Comparative Example 11, including 80% t-butyl acetate and 20% dimethylsulfoxide, has a binary composition molecular volume of 122 ml/mol. Comparative Example 12, including 75% ethyl lactate and 25% dimethyl sulfoxide, has a binary composition molecular volume of 119 ml/mol. Comparative Example 13, including 80% triethyl citrate and 20% dimethyl sulfoxide, has a binary composition molecular volume of 208 ml/mol. These molecular volumes are significantly higher than the desired target range of a molecular volume of less than or equal to 80 ml/mol, which, without wishing to be bound by theory, is believed to provide effective coating removal performance. Consequently, as shown in Table 3, the compositions of Comparative Examples 11-13 did not achieve any substrate exposure during the performance testing for wood substrates coated with oil, epoxy, varnish, and shellac layers. The lack of paint penetration exhibited by Comparative Examples 11-13 is reasonably expected based on the high molecular volumes of the compositions, as well as compositions including these or other high molecular volume esters such as tributyl citrate (molecular volume of 345 ml/mol), diethyl tartrate (molecular volume of 167 ml/mol); esters of lactic acids, including methyl lactate (molecular volume of 96 ml/mol), amyl lactate (molecular volume of 163 ml/mol), and n-butyl lactate (molecular volume of 149 ml/mol); esters of oxalic acid including dibutyl oxalate (molecular volume of 205 ml/mol); sugar esters including sucrose acetate isobutyrate (molecular volume of 739 ml/mol); and carboxylic acid methyl esters including methyl butyrate (molecular volume of 114 ml/mol), methyl propionate (molecular volume of 97 ml/mol), and n-butyl butyrate (molecular volume of 166 ml/mol).

The compositions according to the present disclosure have the benefit of being significantly less toxic to humans than the current solvents used in methylene-chloride based formulations. Accordingly, a significant improvement in compositions for paint stripping applications can be provided by the present disclosure.

The composition and method of the present disclosure further include the following embodiments, which are non-limiting.

Embodiment 1: A composition comprising, based on the total volume of the composition, 30 to 90 volume percent of a first solvent selected from methyl acetate, dimethyl carbonate, acetone, or a combination thereof; greater than 0 to 60 volume percent of a second solvent selected from thiophene, 1,3-dioxolane, thioacetic acid, or a combination thereof; and 0 to 20 volume percent of a third solvent selected from dimethyl sulfoxide, methyl glyoxal, propylene carbonate, gamma butyrolactone, ethylene carbonate, 2-chloro-1-propanol, methanol, ethanol, ethylene glycol, propylene glycol, 1-propanol, 2-propanol, or a combination thereof; wherein the amounts of the first solvent, the second solvent, and the third solvent sum to at least 90 volume percent.

Embodiment 2: The composition of embodiment 1, comprising, based on the total volume of the composition, 30 to 80 volume percent methyl acetate; 20 to 50 volume percent 1,3-dioxolane; and 0 to less than 20 volume percent dimethyl sulfoxide; wherein the amounts of methyl acetate, dimethyl sulfoxide, and 1,3-dioxolane sum to at least 90 volume percent.

Embodiment 3: The composition of embodiment 1 or 2, comprising 25 to 45 volume percent 1,3-dioxolane.

Embodiment 4: The composition of anyone of embodiments 1 to 3, comprising greater than 0 to less than 20 volume percent dimethyl sulfoxide.

Embodiment 5: The composition of any one of embodiments 1 to 4, wherein the composition is substantially free of methylene chloride.

Embodiment 6: The composition of any one of embodiments 1 to 5, wherein the composition is substantially free of N-methylpyrrolidone.

Embodiment 7: The composition of any one of embodiments 1 to 6, wherein the composition is substantially free of methanol.

Embodiment 8: The composition of any one of embodiments 1 to 7, wherein the composition is substantially free of toluene.

Embodiment 9: The composition of any one of embodiments 1 to 8, wherein the composition is substantially free of acetone.

Embodiment 10: The composition of any one of embodiments 1 to 9, wherein the composition is substantially free of dimethyl sulfoxide, thiophene, or both.

Embodiment 11: The composition of any one of embodiments 1 to 10, wherein the composition excludes a swelling agent.

Embodiment 12: The composition of any one of embodiments 1 to 11, wherein the composition has a volatile organic compound content of less than 50%.

Embodiment 13: The composition of embodiment 1, comprising, based on the total volume of the composition, 50 to 60 volume percent methyl acetate; 25 to 35 volume percent 1,3-dioxolane; and 10 to less than 20 volume percent dimethyl sulfoxide.

Embodiment 14: The composition of embodiment 1, comprising, based on the total volume of the composition, 45 to 55 volume percent methyl acetate; 35 to 45 volume percent 1,3-dioxolane; and 5 to 15 volume percent dimethyl sulfoxide.

Embodiment 15: The composition of embodiment 1, comprising, based on the total volume of the composition, 40 to 60 volume percent methyl acetate; and 40 to 60 volume percent 1,3-dioxolane.

Embodiment 16: The composition of any one of embodiments 1 to 15, further comprising, based on the total weight of the first solvent, the second solvent, and the third solvent, greater than 0 to 10 weight percent of an additive selected from the group consisting of thickeners, wetting agents, colorants, rinsing agents, evaporation inhibitors, activators, corrosion inhibitors, surfactants, fragrances, preservatives, and combinations thereof.

Embodiment 17: A method of removing a coating from a surface, the method comprising, contacting a composition according to any one of embodiments 1 to 16 with a surface comprising a coating disposed on at least a portion of the surface; and separating at least a portion of the coating from the surface.

Embodiment 18: The method of embodiment 17, wherein the coating comprises more than one coating layer, wherein each coating layer can be the same or different.

Embodiment 19: The method of any one of embodiments 17 to 18, wherein the coating comprises epoxy, latex enamel paints, alkyd paints, oil-based paints, varnish, shellac, lacquer, polyurethane, chemical agent resistant coatings, conformal coatings, aircraft coatings, automobile coatings, milk paint, or a combination thereof.

Embodiment 20: The method of any one of embodiments 17 to 19, wherein the surface comprises wood, metal, ceramic, brick, stone, concrete, glass, polymer, or a combination thereof.

Embodiment 21: The method of any one of embodiments 17 to 20, wherein the contacting is for a time of 5 to 40 minutes.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). "Or" means "and/or".

The invention claimed is:

1. A composition for removing a coating from a surface, the composition comprising, based on the total volume of the composition,
    55 to 60 volume percent of methyl acetate;
    25 to 35 volume percent of 1,3-dioxolane; and
    10 to less than 20 volume percent of dimethyl sulfoxide;
    wherein the amounts of the first solvent, the second solvent, and the third solvent sum to at least 95 volume percent.

2. The composition of claim 1, wherein the composition is substantially free of methylene chloride.

3. The composition of claim 1, wherein the composition is substantially free of N-methylpyrrolidone, methanol, or both.

4. The composition of claim 1, wherein the composition is substantially free of toluene.

5. The composition of claim 1, wherein the composition is substantially free of acetone.

6. The composition of claim 1, wherein the composition is substantially free of thiophene.

7. The composition of claim 1, wherein the composition excludes a swelling agent.

8. The composition of claim 1, wherein the composition has a volatile organic compound content of less than 50%.

9. The composition of claim 1, further comprising, based on the total weight of the first solvent, the second solvent, and the third solvent, greater than 0 to 5 weight percent of an additive selected from the group consisting of thickeners, wetting agents, colorants, rinsing agents, evaporation inhibitors, activators, corrosion inhibitors, surfactants, fragrances, preservatives, and combinations thereof.

10. A method of removing a coating from a surface, the method comprising,
    contacting a composition according to claim 1 with a surface comprising a coating disposed on at least a portion of the surface; and
    separating at least a portion of the coating from the surface.

11. The method of claim 10, wherein the coating comprises more than one coating layer, wherein each coating layer can be the same or different.

12. The method of claim 10, wherein the coating comprises epoxy, latex enamel paints, alkyd paints, oil-based paints, varnish, shellac, lacquer, polyurethane, chemical agent resistant coatings, conformal coatings, aircraft coatings, automobile coatings, milk paint, or a combination thereof and wherein the surface comprises wood, metal, ceramic, brick, stone, concrete, glass, polymer, or a combination thereof.

13. The method of claim 10, wherein the contacting is for a time of 5 to 40 minutes.

14. The composition of claim 1, further comprising, based on the total volume of the composition,
    greater than 0 to 5 weight percent of formic acid, based on the total weight of the first solvent, the second solvent, and the third solvent.

* * * * *